United States Patent
Klebba et al.

(10) Patent No.: US 12,108,175 B2
(45) Date of Patent: Oct. 1, 2024

(54) DYNAMIC FIXED PATTERN NOISE CALIBRATIONS

(71) Applicant: American Sterilizer Company, Mentor, OH (US)

(72) Inventors: Ryan Klebba, New Braunfels, TX (US); Dai Dang, West Palm Beach, FL (US); Sajeev Krishnan, Ann Arbor, MI (US); Arndt Bussmann, Wesel (DE); Thorsten Heimann, Muelheim an her Ruhr (DE); Carsten Warneke, Muelheim an der Ruhr (DE); Ralf Jeremias, Duisburg (DE)

(73) Assignee: American Sterilizer Company, Mentor, OH (US)

( * ) Notice: Subject to any disclaimer, the term of this patent is extended or adjusted under 35 U.S.C. 154(b) by 58 days.

(21) Appl. No.: 17/884,821

(22) Filed: Aug. 10, 2022

(65) Prior Publication Data

US 2023/0048419 A1    Feb. 16, 2023

Related U.S. Application Data

(60) Provisional application No. 63/251,895, filed on Oct. 4, 2021, provisional application No. 63/232,134, filed on Aug. 11, 2021.

(51) Int. Cl.
*H04N 25/677* (2023.01)
*H04N 25/60* (2023.01)
(Continued)

(52) U.S. Cl.
CPC ........... *H04N 25/677* (2023.01); *H04N 25/63* (2023.01)

(58) Field of Classification Search
CPC ...... H04N 25/677; H04N 25/63; H04N 25/60; H04N 25/67; H04N 17/002; H04N 25/44;
(Continued)

(56) References Cited

U.S. PATENT DOCUMENTS 7,277,568 B2   10/2007   Spahn
7,832,928 B2   11/2010   Topfer et al.
(Continued)

FOREIGN PATENT DOCUMENTS

WO    2011132379 A4    1/2012
WO    2012053315 A1    4/2012
(Continued)

OTHER PUBLICATIONS

International Search Report and Written Opinion from PCT/US2022/039912 dated Nov. 8, 2022.

*Primary Examiner* — Marly S Camargo
(74) *Attorney, Agent, or Firm* — Calfee, Halter & Griswold LLP

(57) ABSTRACT

Dynamic systems and methods for fixed noise pattern calibrations and image corrections are provided. Imaging devices may be calibrated via the system by adjusting an imaging sensor exposure to acquire one or more black images. A global average pixel value is calculated to accumulate pixel values per column of the acquired image. The calculated global average pixel value is then saved as offset imaging data. An average pixel value per column of the imaging data based on the accumulated pixel values may also be calculated, and stored as offset imaging data. A correction matrix may be recomposed based on the offset imaging data and used for calibrating the imaging sensor, and for creating corrected images in or near real time.

21 Claims, 12 Drawing Sheets

(51) Int. Cl.
*H04N 25/63* (2023.01)
*H04N 25/67* (2023.01)

(58) Field of Classification Search
CPC ........ H04N 24/46; H04N 25/443; G06T 7/10;
G06T 7/11; G06T 7/12; G06T 7/194;
G06T 7/215
See application file for complete search history.

(56) References Cited

U.S. PATENT DOCUMENTS

| | | | |
|---|---|---|---|
| 7,965,333 B2 | 6/2011 | Groh et al. | |
| 8,339,475 B2* | 12/2012 | Atanassov | ................ G06T 5/40 |
| | | | 348/229.1 |
| 8,405,711 B2 | 3/2013 | Wang et al. | |
| 8,564,695 B2* | 10/2013 | Moore | ................ H04N 25/677 |
| | | | 348/241 |
| 8,861,888 B2 | 10/2014 | Oyama | |
| 8,976,930 B2 | 3/2015 | Ishizaka | |
| 9,148,594 B2* | 9/2015 | Yuen | ................... H04N 25/677 |
| | | | 348/292 |
| 9,369,639 B2 | 6/2016 | Kobayashi | |
| 9,492,060 B2 | 11/2016 | Blanquart | |
| 10,039,516 B2 | 8/2018 | Topfer et al. | |
| 10,230,906 B2 | 3/2019 | Topfer et al. | |
| 10,341,593 B2 | 7/2019 | Blanquart et al. | |
| 10,621,700 B1 | 4/2020 | Holmes et al. | |
| 2004/0047012 A1* | 3/2004 | Schrey | ................... H04N 23/70 |
| | | | 358/474 |
| 2005/0093991 A1 | 5/2005 | Yokohata et al. | |
| 2005/0104981 A1* | 5/2005 | Findlater | ............... H04N 25/677 |
| | | | 348/241 |
| 2005/0219388 A1 | 10/2005 | Hornig | |
| 2005/0242269 A1 | 11/2005 | Hayashi et al. | |
| 2005/0242380 A1 | 11/2005 | Suzuki et al. | |
| 2006/0256215 A1 | 11/2006 | Zhang et al. | |
| 2006/0287580 A1 | 12/2006 | Jo et al. | |
| 2007/0195164 A1 | 8/2007 | Fukuyama | |
| 2007/0210258 A1 | 9/2007 | Endo et al. | |
| 2008/0031537 A1 | 2/2008 | Gutkowicz-Krusin et al. | |
| 2009/0201411 A1 | 8/2009 | Ono | |
| 2009/0213211 A1 | 8/2009 | Bayer et al. | |
| 2009/0290050 A1 | 11/2009 | Herrmann et al. | |
| 2010/0110223 A1 | 5/2010 | Kobayashi | |
| 2010/0237149 A1 | 9/2010 | Olmstead | |
| 2011/0108710 A1 | 5/2011 | Yonekawa | |
| 2013/0194463 A1* | 8/2013 | Ogino | .................. H04N 25/677 |
| | | | 348/243 |
| 2013/0259203 A1 | 10/2013 | Ishizaka | |
| 2014/0313378 A1* | 10/2014 | Yuen | .................... H04N 25/677 |
| | | | 348/272 |
| 2015/0131785 A1 | 5/2015 | Topfer et al. | |
| 2019/0281239 A1 | 9/2019 | Blanquart et al. | |
| 2020/0020726 A1 | 1/2020 | Anas et al. | |

FOREIGN PATENT DOCUMENTS

| | | |
|---|---|---|
| WO | 2013073418 A1 | 5/2013 |
| WO | 2014145244 A1 | 9/2014 |

* cited by examiner

DYNAMIC FIXED PATTERN NOISE CALIBRATIONS

CROSS-REFERENCE TO RELATED APPLICATIONS

This application claims priority to and any benefit of U.S. Provisional Application No. 63/232,134, filed Aug. 11, 2021, and U.S. Provisional Application No. 63/251,895, filed Oct. 4, 2021, the contents of which are incorporated herein by reference in their entireties.

FIELD

The present disclosure relates generally to the field of imaging, and more particularly, to systems and methods for dynamically correcting imaging defects including fixed noise patterns.

BACKGROUND

Live video of a surgical site for diagnostic and therapeutic purposes may be display via a camera sensor, receiver and processor combination. Certain sensor, receiver combinations produce raw images, as illustrated in FIG. 1, with alternating light and dark vertical bands known as column fixed pattern noise (FPN). Such defects persist under all external light conditions and are problematic when diagnosing conditions.

In view of the above issues, there is an unmet need for an improved imaging system that corrects images by reducing and/or eliminating image defects, including column FPN, during image data acquisition, in or near real time.

SUMMARY

In exemplary embodiments, live video of a surgical site for diagnostic and therapeutic purposes may be display via a camera sensor, receiver and processor combination. The acquired image data (of the live video) may include one or more defects. The image data is processed in or near real time via one or more of exemplary methods and/or systems shown or described herein using a recomposed correction matrix (including parameters for adjusting imaging data) and applying the recomposed correction matrix (or one or more of its parameters) to produce a corrected image.

In one exemplary embodiment, a system for correcting defects in image data is provided. The system includes a memory including image data processing instructions for stored thereon. The system also includes a processor in communication with the memory and configured to execute the instructions to perform various operations. At least one operation includes adjusting an imaging sensor exposure to acquire one or more black images. Another operation includes calculating a global average pixel value of an acquired image with fixed pattern noise (FPN) to accumulate pixel values per column of the acquired image, and storing the calculated global average pixel value as offset imaging data. The operation also includes calculating an average pixel value per column of the imaging data based on the accumulated pixel values, and storing the calculated average pixel value per column as offset imaging data. Additionally, the operation includes recomposing a correction matrix based on the offset image data.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Figure 1:
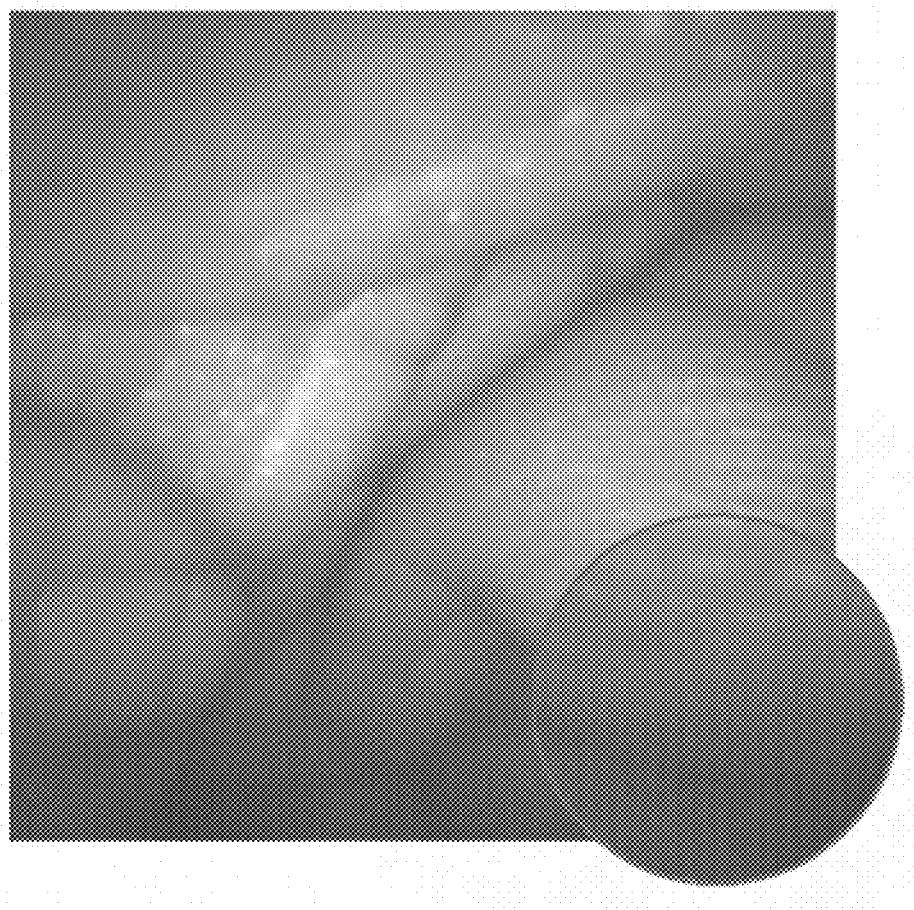
FIG. 1 illustrates vertical bands of column fixed pattern noise (FPN) in a raw image.

Various embodiments will be understood more fully from the detailed description given below and from the accompanying drawings of the various aspects and implementations of the disclosure. This should not be taken to limit the embodiments to the specific aspects or implementations, which are being provided for explanation and understanding only.

At a high-level, the present application relates to validating a medical device (e.g., a ureteroscope or endoscope) at initialization, which allows for real time scope calibration.

It was determined that column fixed pattern noise (FPN) could be corrected in or near real time by scope calibration, and prior to displaying any image data to a user. FPN persists under all external light conditions and may include the same or similar peak-peak pixel values (i.e., the difference in intensity of bright vs dark pixels). As a result, it was determined that the FPN could be corrected using a real time scope calibration and correction operation (e.g., as provided by an image data processing instructions (DPI), as described in further detail below).

For real time scope calibration, one or more system sensors are provided and may be operable to detect a presence of the scope (e.g., the sensor detects that the scope is plugged into and/or in wireless communication with a console).

In some embodiments, a system command from the console (e.g., DPI instructions) may be executed to the imaging sensor detected by the console to adjust one or more parameters of the imaging sensor to acquire or otherwise capture one or more black images. For example, the exposure of the imaging sensor may be set to zero (0) or a low setting for acquiring black images. In some embodiments, the low setting may be the lowest setting for the imaging sensor, for example, if a zero setting in not available. Additionally, or alternatively, any LEDs may be turned off or disabled, and/or a shutter of the imaging sensor (or an imaging device including the imaging sensors) may be closed for acquiring the black images.

A black image may then be recorded, and imaging data for the black image may be logged or otherwise saved as offset calibration data. In some embodiments, the offset calibration data may be saved in a Field Programmable Gate Array (FPGA) RAM memory.

With each image frame accessed via the imaging sensor, a correction to remove FPN is performed. This data, used for removing any FPN, may also be logged or saved as offset calibration data.

In some embodiments, for example, as imaging data is acquired frame by frame by at least one of the system devices or sensors (e.g., the imaging sensor and/or an image capturing device), a correction of the acquired imaging data is performed using the offset calibration data and/or FPN, to reduce or otherwise remove the FPN and its vertical lines.

In some embodiments, and prior to using the offset calibration data to remove any FPN, the system may check the imaging data to determine if FPN (or any other defects or artifacts) are present and require correcting.

Figure 2:
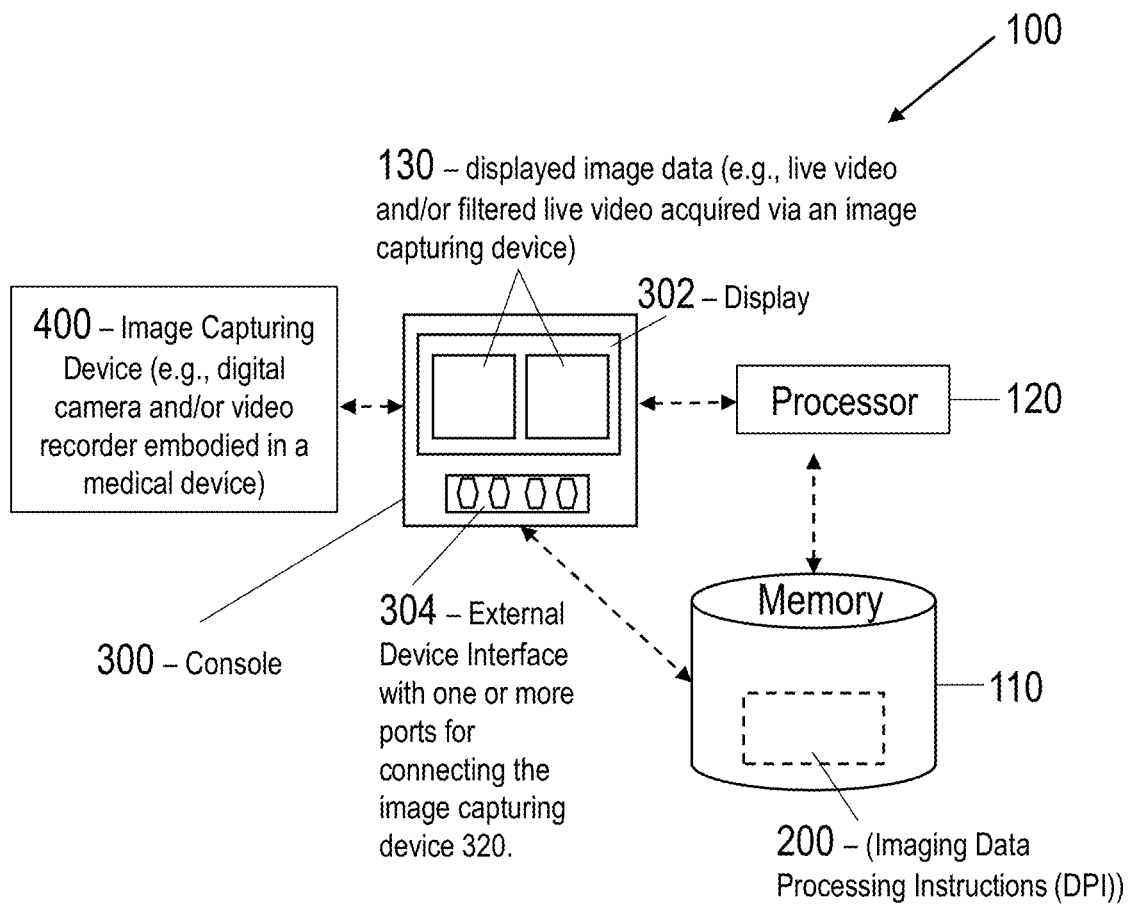
FIG. 2 illustrates an exemplary embodiment of an calibration and image correction system in accordance with one or more embodiments shown and described herein.

With reference now to FIG. 2, a system 100 for calibrating image capturing devices and correcting image defects is provided.

In some embodiments, as illustrated in FIG. 2, the system 100 includes a memory 110 in operable communication with a processing circuit (also referred to as processor) 120.

The memory 110 may include programmable instructions and/or logic for performing real time scope calibration and/or correcting defects in image data (e.g., image data processing instructions (DPI) 200) stored thereon. The processor 120 may be in signal communication with the memory 110 for executing the DPI 200 stored on the memory 110.

Figure 12:
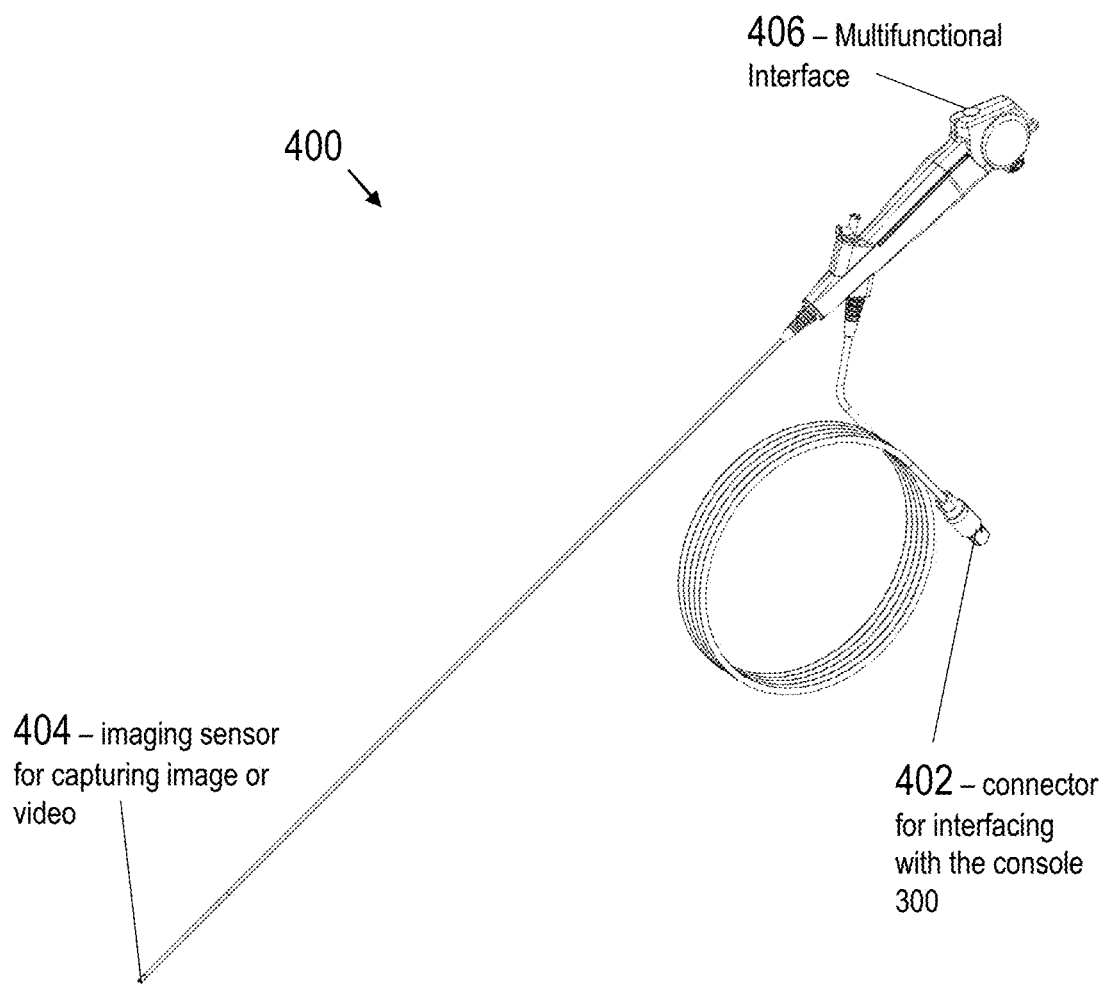
FIG. 12 illustrates an exemplary embodiment of an image capturing device in accordance with one or more embodiments shown and descried herein.

The system 100 may also include a sensor (not shown) for detecting when a scope is initialized (e.g., connected to a console 300 and/or powered on), and a sensor 140 (as shown in FIG. 12) for capturing or otherwise acquiring images or video.

With continued reference to FIG. 2, the system 100 may also include an imaging console 300. The console 300 may facilitate the transmission of images and/or imaging data throughout the system 100. In some embodiments, the console 300 may include a display 302 for displaying images and/or imaging data 130. The console 300 may also include a device interface 304 having one or more ports for connecting one or more components of the system 100. In some embodiments, the device interface 304 may include a port for interfacing with the sensor 140 and/or an image capturing device 400 that may include the sensor 140. The console 300 may receive images from the sensor 140 via the device interface 304, and may display the images and/or imaging data (raw and/or processed) of the images via the display 302 and/or an external display accessible to the system 100. The console 300 may also include a port for connecting one or more external display devices to the console 300. It should be appreciated that the display devices and/or sensors may also be configured to wirelessly interface with the console 300. It should be further appreciated that components of the system 100 may be connected via wires or wireless.

Figure 3:
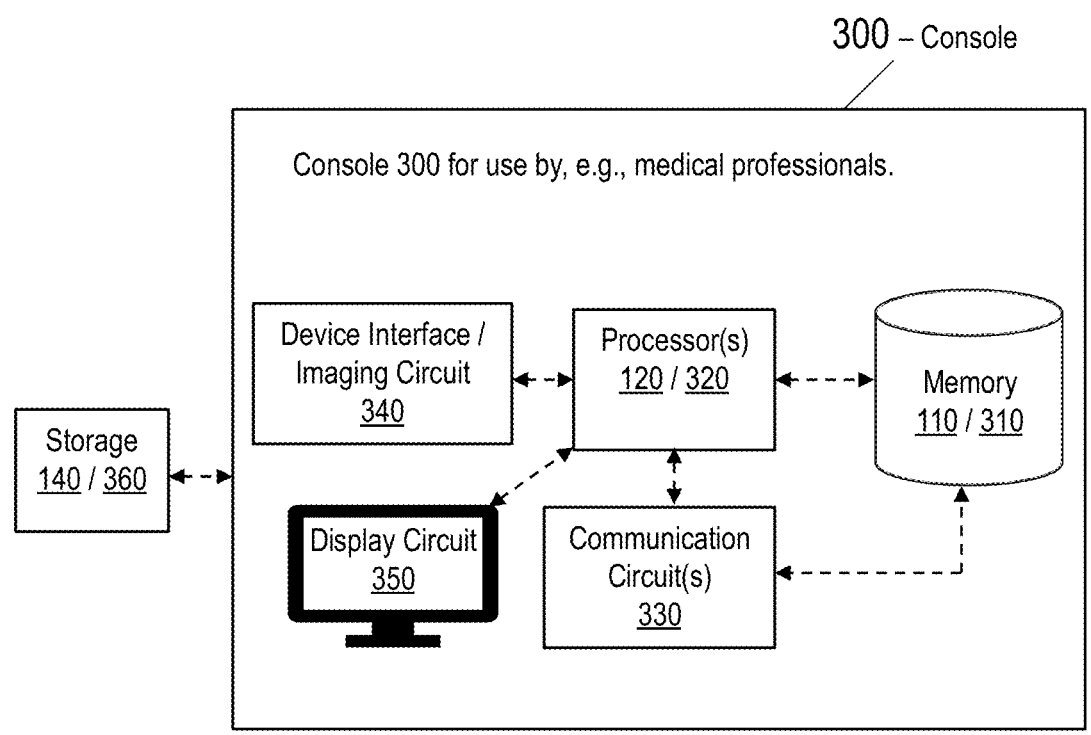
FIG. 3 is a schematic block diagram of an exemplary console in accordance with one or more embodiments shown and described herein.

With reference now to FIG. 3, the console 300 may be a computer, or in some embodiments, an operator's device, such as a mobile device, or other device known in the art for receiving and/or processing image data acquired from the sensor 140 and/or image capturing device 400. It should be appreciated that the console 300 may include logic configured to perform the various functions and processes described herein. For example, in some embodiments, the console 300 may include a memory 310 storing logic for performing the console 300 functions or other functions of the system 100. The memory 310 may be in communication with a processor 320, which is operable to execute any logic stored on the memory 310 and/or any other storage medium (e.g., storage medium 360).

In some embodiments, the imaging data 130 (e.g., images captured via the image capturing device) may be stored on the console memory 310. However, it should be appreciated that the imaging data 130 may be stored on other storage mediums accessible to the system 100 (e.g., the storage medium 360 of FIG. 3). It should be also appreciated that the imaging data may raw (unedited) data and/or processed imaging data (i.e., imaging data that is preprocessed prior to being processed by the system 100 or imaging data that is processed via the system 100 (or components of the system 100)).

The console 300 may further include a communication circuit 330 for communicating with one or more devices of the system 100 (or with devices external to the system 100), and an imaging circuit 340 for processing any acquired images at the console 300 level. In some embodiments, the console 300 may include a display circuit 350 operable to display images or imaging data 130 in or near real time via the display 302 (FIG. 2).

In some exemplary embodiments, the console 300 may be a display panel (e.g., a monitor) for other HDMI compatible modalities within the system 100. The console 300 may be attached or associated with, for example, an operating room boom so as to provide not only the capability of using the console 300 for normal operation of a ureteroscope, but to also allow a display of other HDMI (or alternate) video signals on the console 300 during alternate procedure not using a ureteroscope. This example may allow the boom panel to be more universal to accept and display multiple different devices in the system 100. For example, if a user desired a monitor for other procedure types, such as laparoscopy, cystoscopy, arthroscopy, etc., the user could utilize the console 300 attached to or associated with a boom to receive video from the other modalities. It should be appreciated that, without this feature, the boom would only be able to be used with the console 300 ureteroscope procedure.

In yet another exemplary embodiment, to activate an alternate input feature for the console 300, a user may go to the menu setting and select HDMI input. If another source is powered on and actively sending an HDMI signal, when that HDMI input is plugged into the console 300, the user can switch video feeds to that HDMI in port that is connected to the other source. This enables the user to view video from the other source on the console. In an example, if the user were to be in an active procedure using the console 300 ureteroscope and another HDMI modality was plugged into the HDMI in on the console and powered on, there would be no effect to the display input as the user must actively navigate to the HDMI settings and select the alternate input in order to enable the feature.

In addition to display devices, computers also include other peripheral output devices, which may be connected through an output peripheral interface. The computers implementing various embodiments described herein operate in a networked environment using logical connections to one or more remote computers, the remote computers typically include many or all of the elements described above.

The communication circuits 330 may include antennas and/or data ports and driver chips for sending and receiving communications with devices external to the console 300. The communication circuits 250 can include any one or more of WiFi antennas and circuitry, LTE antennas and circuitry, GPS antennas and circuitry, CDPD antennas and circuitry, GPRS antennas and circuitry, GSM antennas and circuitry, UMTS antennas and circuitry, and other antennas and circuitry, USB ports and circuitry (e.g., standard, micro, mini, etc.), RS-232 ports and circuitry, proprietary ports and circuitry (e.g., Apple's® 30-pin and Lightning ports), RFID antennas and circuitry, NFC antennas and circuitry, bump technology antennas and circuitry, a Bluetooth antenna and circuitry, and other antennas, ports, and circuitry.

The display circuit 350 may include any one or more of LEDs, NxM textual displays, matrix displays on which a graphical user interface ("GUI") can be presented, e.g., a color or monochrome liquid crystal display ("LCD") or organic light-emitting diode ("OLED") display, with associated drive chips, and/or one or more graphics circuits (e.g., VGA or HDMI) for an external display, or other displays.

With reference to FIG. 12, in some embodiments, image capturing device 400 may include a port connector 402 for interfacing with the console 300. In some embodiments, the imaging sensor 140 may be including with the image capturing device 400 (e.g., at a distal end of the image capturing device 400), or in other embodiments, the image capturing device 400 may include its own sensor 404. It should be appreciated that the number of sensors provided with the image capturing device 400 may differ based on operational imaging needs.

In some embodiments, the image capturing device 400 may include a multifunctional interface 406 for controlling one or more functions of the image capturing device 400 and/or its sensors or other components in communication with the image capturing device 400.

In some embodiments, the multifunctional interface 406 may be a multifunctional button that may be selected or depressed to initiate a desired function. In some embodiments, for example, selecting or depressing the multifunctional interface 406 for a first duration may cause the image capturing device 400 to perform a first operation, and selecting or depressing the multifunctional interface 406 for a second duration may result in a second operation that differs from the first operation. It should be appreciated that the first duration may be less than the second duration.

In some embodiments, selecting or depressing the multifunctional interface 406 once may result in an operation that differs from selecting or depressing the multifunctional interface 406 more than once. In some embodiments, a tempo at which the multifunctional interface 406 is selected may determine the type of function being performed. For example, long presses of the multifunctional interface 406 may result in an operation that differs from selections of the multifunctional interface 406 that include a deliberate pause between selections.

In some embodiments, feedback may be provided to the operator or use selecting the multifunctional interface 406 to confirm that desired function has been completed. The feedback may be provided visually (e.g. via indicia or other indicator) or in audible (e.g. a beep and/or voice confirmation). Additionally, or alternatively, the feedback may be haptic feedback. In some embodiments, the feedback may be the operation or function itself being performed. For example, a long press may allow the operator to zoom in on a specific area. Here, the image zooming in and/or out may be feedback confirming the successful execution of the desired function initiated using the multifunctional interface 406.

Exemplary default settings for one or more embodiments of the multifunctional interface 406 are described hereafter. In some embodiments, the multifunctional interface 406 performs such that selecting for a shorter period of time and/or depressing the multifunctional interface 406 once results in the image capturing device 400 to capture a picture. Additionally, or alternatively, selecting for a shorter period of time and depressing the multifunctional interface 406 twice enlarges (zooms in) the image displayed on the console 300. In some embodiments, selecting for a shorter period of time and depressing the multifunctional interface 406 twice a second time reduces (zooms out) the image displayed on the console 300, and selecting for a longer period of time and depressing the multifunctional interface 406 once starts recording of video and selecting for a longer period of time and depressing the multifunctional interface once again stops recording of video. Although these functions described in this example are the default setting, in any exemplary embodiment, the user may change the default functions via a user configuration within the menu settings where duration or number of clicks could change based on the feature the user is trying to activate.

Figure 4:
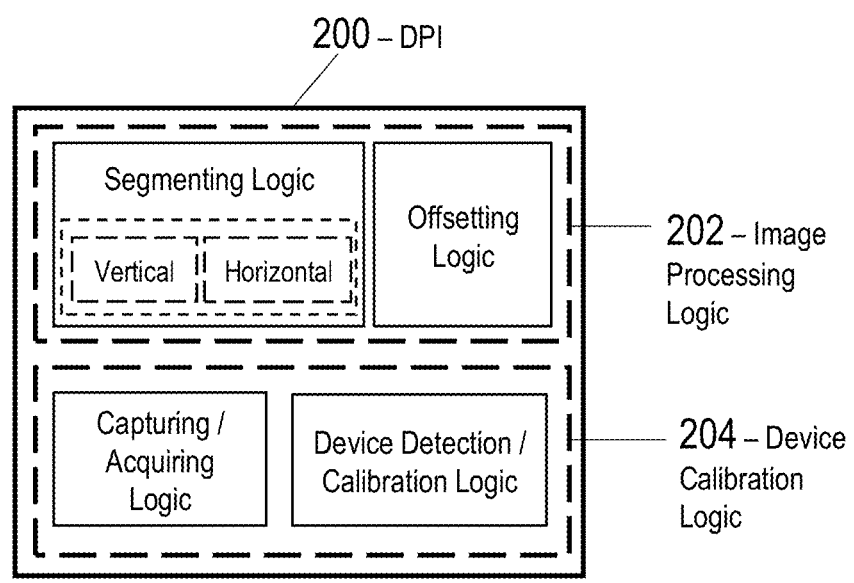
FIG. 4 is a schematic block diagram of exemplary logic for calibrating sensors and correcting images in accordance with one or more embodiments shown and described herein.

With reference now to FIG. 4, in some embodiments, the DPI 200 may include a plurality of instructions or modules that, when executed by the processor 120, causes the system 100 to calibrate the scope in or near real time, and/or to apply a filter/matrix (e.g., image correction parameters) to correct any defects or artifacts in images and/or imaging data acquired, for example, via the sensor 140 and/or other live video stream during a medical procedure.

The term "module" used herein will be appreciated as comprising various configurations of computer hardware and/or software implemented to perform operations. In some embodiments, logics or modules as described may be represented as instructions operable to be executed by a processor and a memory. In other embodiments, logics or modules as described may be represented as instructions read or executed from a computer readable media. A logic or module may be generated according to application specific parameters and/or user settings. It will be appreciated by those of skill in the art that such configurations of hardware and software vary, but remain operable in substantially similar ways.

Figure 5:
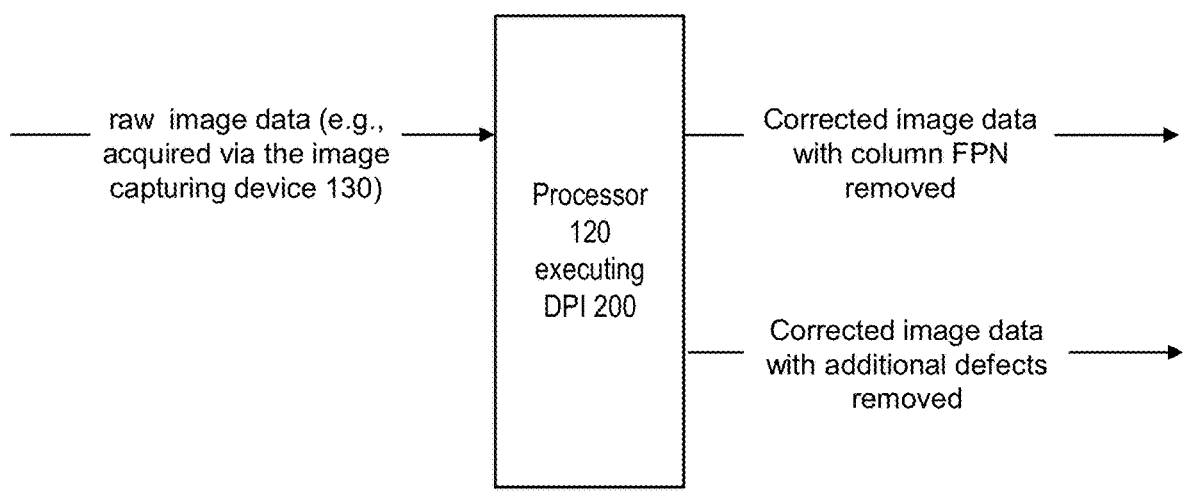
FIG. 5 is a schematic flow diagram showing various inputs and outputs for the exemplary processors of FIG. 3.
Figure 8A:
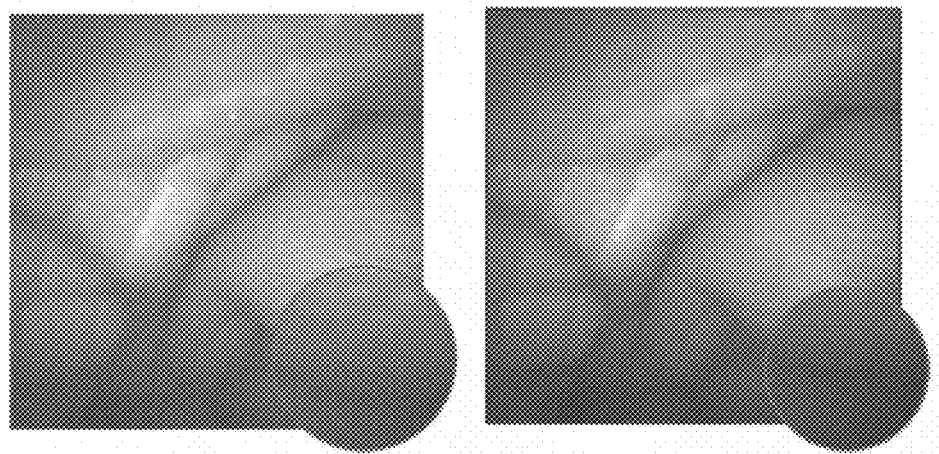
FIG. 8A illustrates exemplary image data processed via one or more of the exemplary methods and/or systems shown and described herein, with the FPN reduced or eliminated.
Figure 8B:
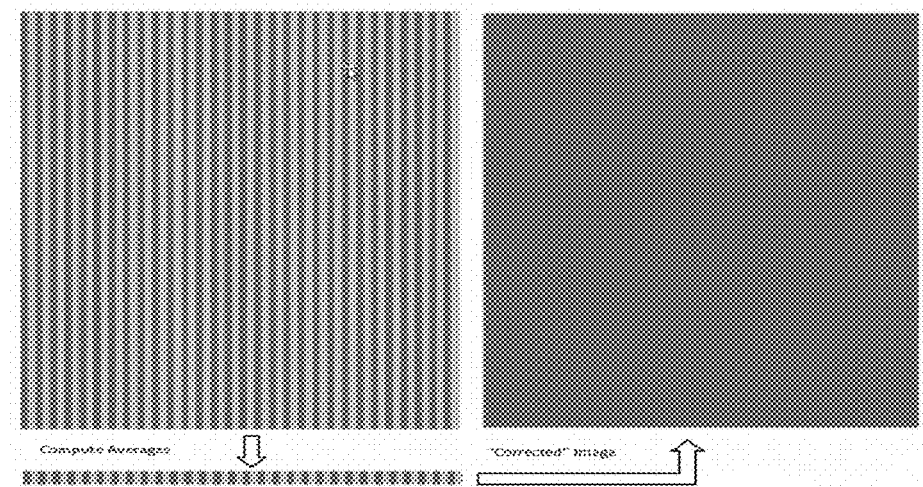
FIG. 8B also illustrates exemplary image data processed via one or more of the exemplary methods and/or systems shown and described herein, with the FPN reduced or eliminated.
Figure 9A:
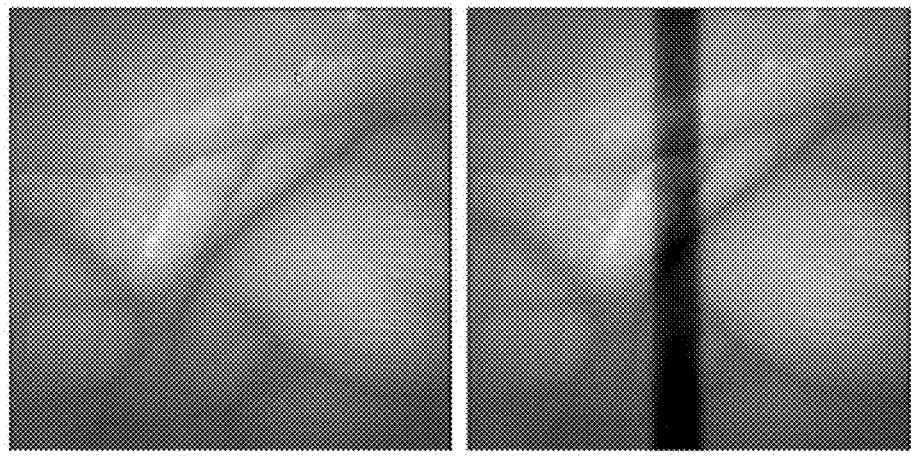
FIG. 9A illustrates exemplary image data, processed via one or more of the exemplary methods and/or systems shown and described herein, and having an additional defect.
Figure 9B:
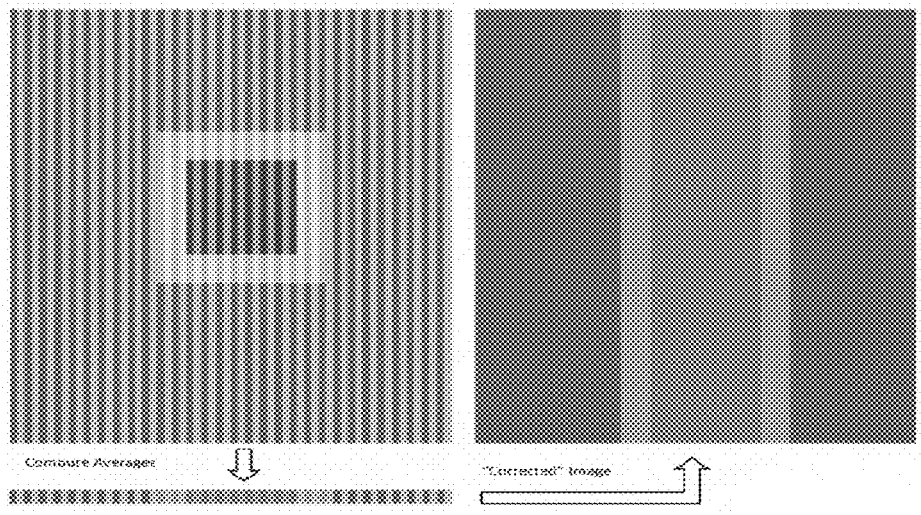
FIG. 9B also illustrates exemplary image data, processed via one or more of the exemplary methods and/or systems shown and described herein, and having an additional defect.
Figure 11A:
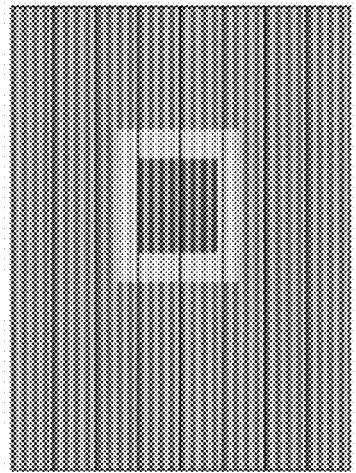
FIG. 11A illustrates the exemplary image data of FIG. 9B processed using a vertical segmentation via one or more of the exemplary methods and/or systems shown and described herein.
Figure 11B:
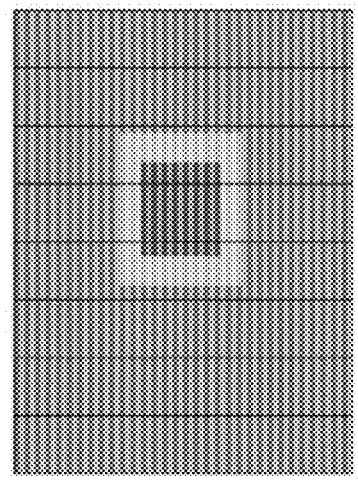
FIG. 11B illustrates the exemplary image data of FIG. 9B processed using a horizontal segmentation via one or more of the exemplary methods and/or systems shown and described herein.
Figure 11C:
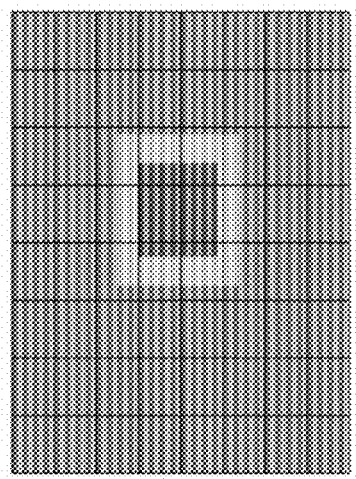
FIG. 11C illustrates exemplary image data of FIG. 9B processed using a vertical and horizontal segmentation via one or more of the exemplary methods and/or systems shown and described herein.

In some embodiments, the DPI 200 may include image processing logic 202 for processing any acquired images and/or video, and to correct one or more defects in any raw image data. For example, the DPI 200 may include instructions for correcting FPN in an image (e.g., as shown in FIGS. 8A and 8B) Additionally, or alternatively, the DPI 200 may include instructions for correcting non-FPN defects or other artifacts in images or imaging data (e.g., as shown in FIGS. 9A and 9B). As shown in FIG. 5, it should be appreciated that, as image data (e.g. raw image data) is acquired (e.g., by the image capturing device 400), the DPI 200, when executed by the processor 120 (or console processor 320), corrects any defects (e.g., FPN or light leaks) in or near real time by applying filters (i.e., adjusting image parameters) in the device or console 300 level. In some embodiments, the image processing logic 202 may include instructions for segmenting any images and/or for parsing any imaging data (as shown in FIGS. 11A-11C). The segmenting logic may include instructions to vertically and/or horizontally segment images.

With continued reference to the figures, the DPI 200 may also include device calibration logic 204 (FIG. 4) for real time device calibration when a device is initialized. It should be appreciated, that the parameters established via the image processing logic 202 may be used for calibrating one or more devices of the system 100 (e.g., the image capturing device 400), via the device calibration logic 204.

In some embodiments, the device calibration logic 204 may include instructions to monitor and/or sense when a device (e.g., the image capturing device 400) is connected to the console 300 (e.g., wireless or via the device interface 304), and to calibrate the device by adjusting one or more imaging parameters of the device.

The device calibration logic 204 may also include instructions for capturing or otherwise acquiring the images or video captured via the connected device, and for applying any filters (e.g., a recomposed matrix) to any acquired images or video at the device level and/or console 300 level.

In some embodiments, for calibrating the image capturing device 400, the DPI 200 may include logic for controlling the manual/auto functions of the image capturing device 400, and for adjusting any image parameters (e.g., brightness, contrast, exposure, etc.) of the image capturing device 400. In some embodiments, for correcting FPN, instructions for setting the image capturing device 400 to a low setting may be provided. In this embodiment, for example, an exposure of the image capturing device 400 may be set to its lowest setting or a zero setting to simulate a fully dark environment. Additionally, or alternatively, any LEDs (e.g., an LED of the device) may be turned off or disable.

In some embodiments, raw images may be captured or acquired, for example, via the video pipeline for creating a recomposed correction matrix. If additional video or images are being captured, instructions for stopping any video streaming may also be provided.

Upon acquiring the raw image, instructions for calculating a global average of pixel values may be provided. This calculation may be used to determine the average dark level of the complete image (i.e., the acquired image).

In some embodiments, instructions for calculating an average dark level per column may be provided. To calculate the average dark level per column, instructions for accumulate (sum up) the pixel values per column of the image is provided. In some embodiments, instructions for recomposing the correction matrix are provided and based on the average values per column for the complete image.

Upon recomposing the correction matrix, the LED may be turned on (or enabled), and the values of the recomposed matrix used to adjust parameters (values) of the acquired image to produce a corrected image (or video). It should be appreciated that one or more instructions of the DPI 200 provide a real time or near real time correction of any images or video streamed (e.g., via the image capturing device 400) by application of one or more of the correction matrix or corrected image values.

In some embodiments, the DPI 200 may include instructions for correcting non-FPN defects (e.g., yellowing). Non FPN defects may result from, for example, high incident light conditions (e.g., conditions that may be caused if the sensor 140 is pointed at a direct light source).

To correct any additional defects or remove artifacts, the DPI 200 may include instructions to compare every pixel in the raw image to a global threshold for bright and/or dark levels. Additionally, instructions for accumulating pixel values that are within a plausible range may be provided. In some embodiments, the ranged may be indexed by column.

The DPI 200 may include instructions to count the number of plausible pixels, indexed by column, to calculate an average value per column. These values may be used for recomposing the correction matrix, and for adjusting one or more imaging parameters to correct FPN and non-FPN defects.

Additionally, or alternatively, as previously described, the DPI 200 may use its segmenting logic (e.g., vertical and/or horizontal segmentation) to correct image defects.

In this embodiment, the image may be segmented into multiple vertical section of a predefined width (FIG. 11A), which may be based on image size or utility. Thereafter, the DPI 200 may include instructions to compare every pixel in a single segment (or plurality of segments, as required) to a global threshold for bright and/or dark levels. Additionally, pixel values within a plausible range are accumulated and indexed by column. If any implausible pixels are encountered, the column may be rejected. This process may continue until the section limit length is encountered. It should be appreciated that if all vertical regions are rejected due to multiple bright spots, the DPI 200 may include instructions to implement a horizontal segmentation (FIG. 11B), and the above process for identifying plausible pixels may be repeated.

In some embodiments, upon identifying a plausible segment, the correction matrix may be retiled over a width of the image (e.g., the complete width) to compose a full correction matrix for vertical segmentation, and over the length of the image (e.g., the complete length) to compose a full correction matrix for horizontal segmentation.

In some embodiments, for example, as shown in FIG. 11C, the DPI 200 may include instructions for segment the image into checkerboard sections of a predefined width and/or length. In this embodiment, the processes described above for the vertical and/or horizontal segmentation may be applied to compose a full (complete) correction matrix using the checkerboard segmentation. It should be appreciated that, in this embodiment, once a plausible segment for correcting a corresponding defective segment is identified, the correction matrix (e.g., the recomposed correction matrix) may be retiled over the width and length (e.g., the full width and length) of the image to compose the full correction matrix.

Figure 6:
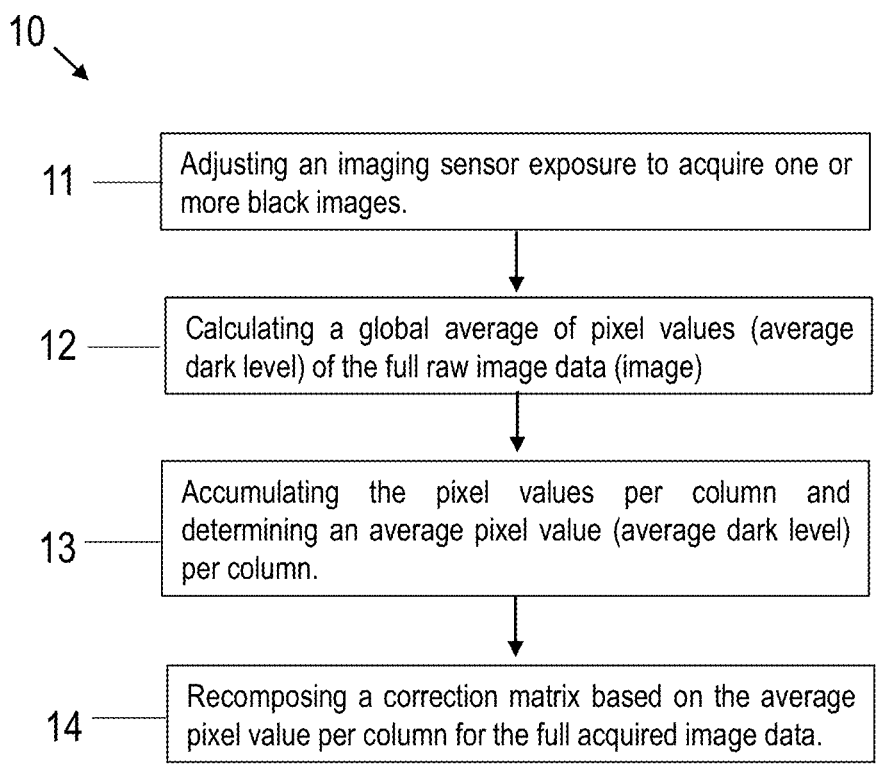
FIG. 6 illustrates a flowchart for an exemplary embodiment of a method of calibrating one or more sensors in accordance with one or more embodiments shown and described herein.
Figure 7:
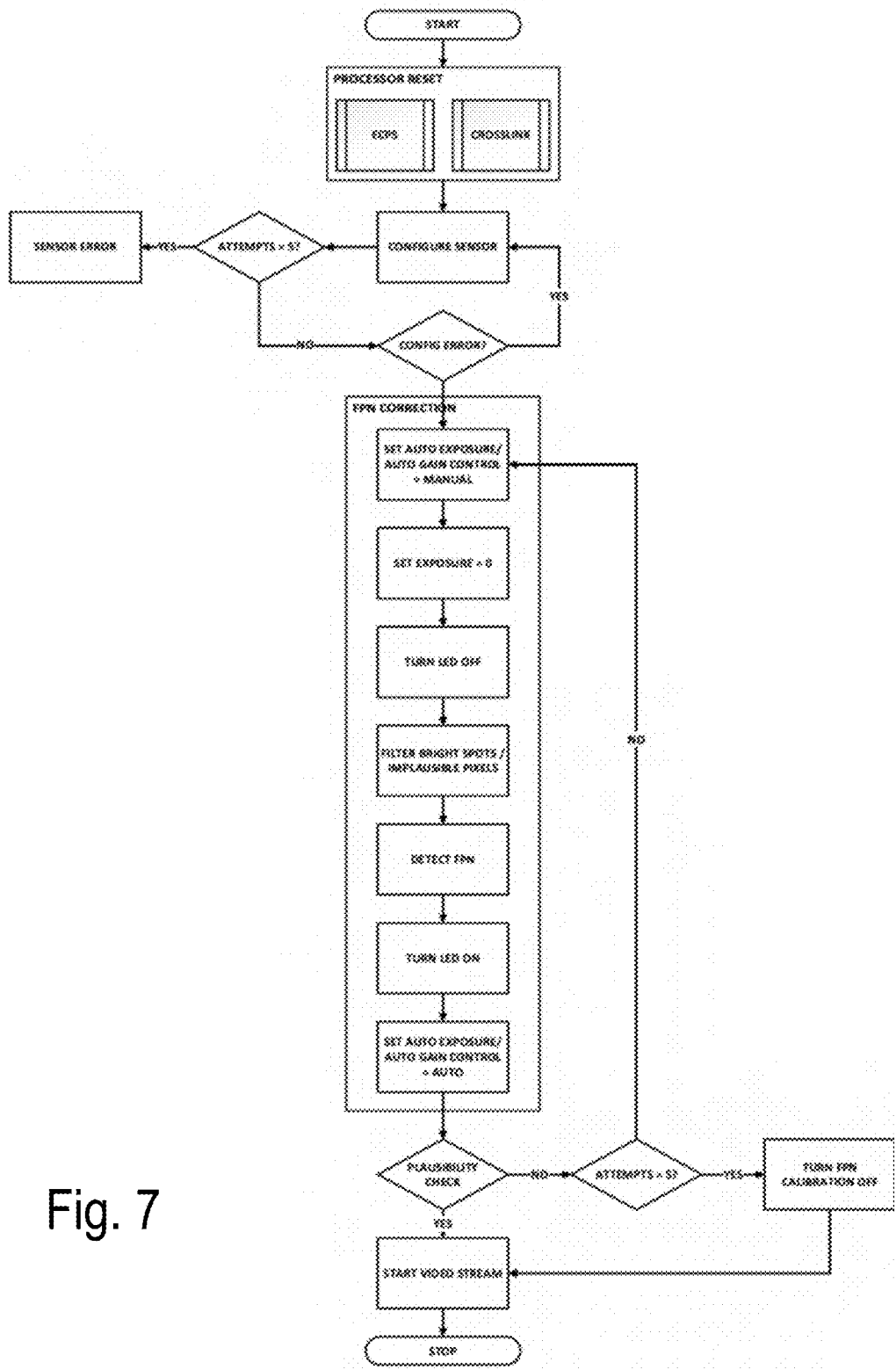
FIG. 7 illustrates an exemplary embodiment of a process for calibrating an imaging sensor and correcting image defects, including column FPN, in accordance with one or more embodiments shown and described herein.

With reference now to FIG. 6, a method 10 for calibrating an imaging sensor upon initiation and in or near real time is provided.

It should be appreciated that the steps of the exemplary methods and/or operations described herein may be performed in a different order, with illustrated steps omitted, with additional steps added, or with a combination of reordered, combined, omitted, or additional steps.

In step 11, adjusting one or more parameters of the sensor 140 and/or imaging data (e.g., raw image data). In this step, an exposure for the imaging sensor 140 may be adjusted to its lowest setting for capturing or otherwise acquiring black images or imaging data via the sensor 140 and/or image capturing devices 400.

In step 12, calculating a global average of pixel values of the acquired image data (e.g., the complete raw image data). In this step, the an average pixel value for the image data is calculated. In step 13, accumulating (i.e., determining the sum of) the pixel values per column and determining an average pixel value (average dark level) per column. In this step, a sum of the pixel values per column of the acquired image data is calculated. In step 14, recomposing a correction matrix based on the average pixel value per column for the full acquired image data.

Upon recomposing the correction matrix, the correction matrix may be used for calibrating the sensor 140.

Figure 10:
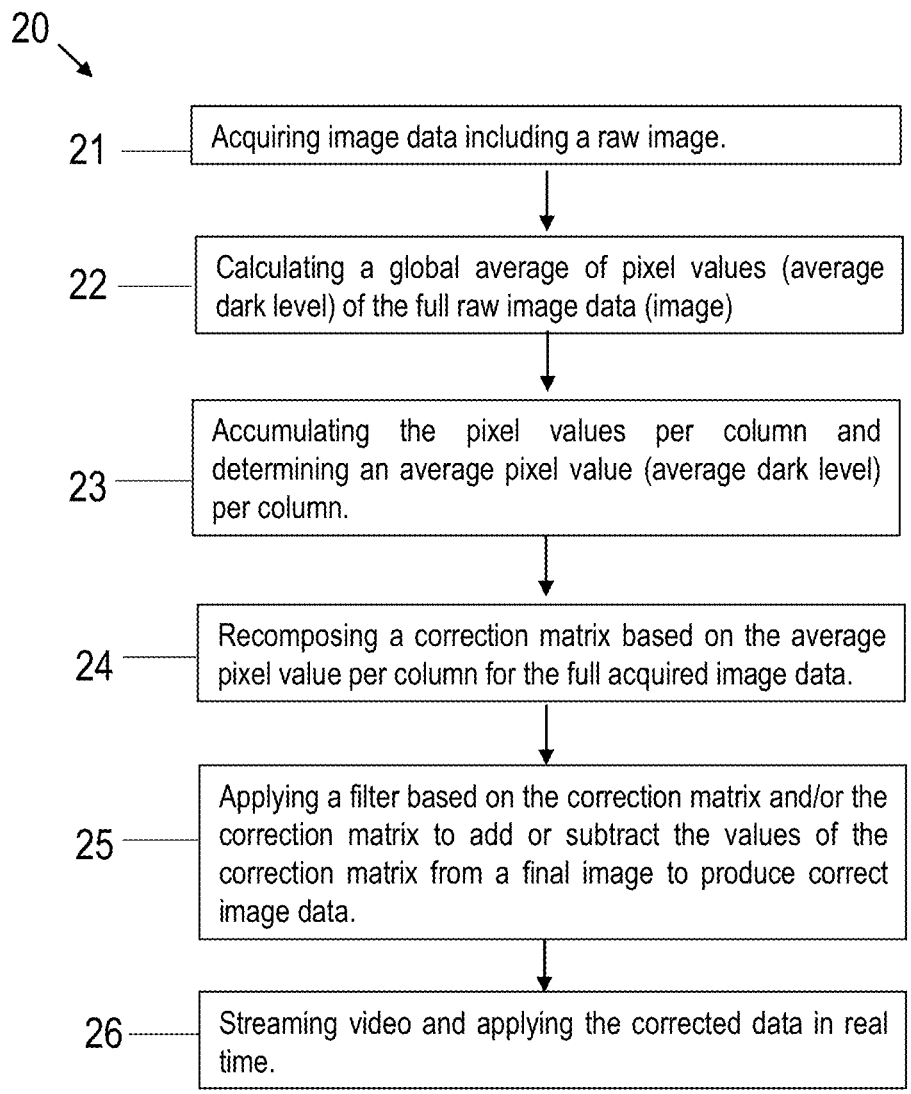
FIG. 10 illustrates a flowchart for an exemplary embodiment of a method of correcting image defects in accordance with one or more embodiments shown and described herein.

With reference now to FIG. 10, a method 20 for correcting one or more defects in image data is provided. In step 21, acquiring image data (e.g., raw image data). The image data may be acquired via one or more sensors and/or the image capturing device 400 (FIG. 3). Steps 22-24 may be similar to steps 12-14 in that a average of pixel values may be calculated and used for recomposing a correction matrix.

In step 25, the method includes the step of applying the recomposed correction matrix and/or a filter based on the correction matrix to adjust (add or subtract) the values of the correction matrix from a final image to produce corrected image data. In step 26, images and/or video may be streamed and the recomposed (or full) correction matrix applied in or near real time to produce corrected images/videos.

It should be appreciated that computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM).

Operators/Users may enter commands and information into the computer through a user interface (UI) that includes input devices such as a keyboard and pointing device, commonly referred to as a mouse. Other input devices may include a microphone, scanner, voice recognition device, touch screen, toggle switch, pushbutton, or the like. These and other input devices are often connected to the processing unit through a user input interface that is coupled to a system bus, but may be connected by other interface and bus structures, such as a parallel port or a universal serial bus (USB).

One or more monitors or display devices (e.g., a display 302 as shown in FIG. 2) may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically include many or all of the elements described above.

Various networks may be implemented in accordance with the embodiments described herein, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism.

Computers may be connected over the Internet, an Intranet, Extranet, Ethernet, or any other system that provides communications. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

We claim:

1. An imaging method comprising:
adjusting an imaging sensor exposure to acquire one or more black images;
calculating a global average pixel value of an acquired image with fixed pattern noise (FPN) to accumulate pixel values per column of the acquired image, and storing the calculated global average pixel value as offset imaging data;
calculating an average pixel value per column of the imaging data based on the accumulated pixel values, and storing the calculated average pixel value per column as offset imaging data; and
recomposing a correction matrix based on the offset imaging data.

2. The method of claim 1, wherein recomposing the matrix further includes:

vertically or horizontally segmenting the full acquired image to remove any additional artifacts in the acquired image using the segmented parts of the acquired image.

3. The method of claim 1, wherein the exposure is set to a low setting.

4. The method of claim 3, wherein the exposure is zero.

5. The method of claim 1, wherein prior to adjusting the imaging sensor exposure to acquire one or more black images, the method further comprises:

detecting an imaging sensor; and calibrating the imaging sensor using a recomposed correction matrix.

6. The method of claim 5 further comprising:

acquiring imaging data associated with an image or video via the imaging sensor; and applying the recomposed matrix to the acquired image or video.

7. The method of claim 6, wherein applying the recomposed matrix to the acquired image includes:

adjusting one or more parameters of the acquired image imaging data based on offset imaging data of the recomposed matrix.

8. The method of claim 6, wherein applying the recomposed matrix to the acquired image includes:

subtracting values corresponding to one or more parameters of the recomposed matrix from one or more parameter of the acquired image imaging data to produce a corrected image or video.

9. The method of claim 6, wherein applying the recomposed matrix to the acquired image includes:

adding values corresponding to one or more parameters of the recomposed matrix to one or more parameter of the acquired image imaging data to produce a corrected image or video.

10. The method of claim 6 further comprising:

identifying a defect in one or more segments of the acquired image; segmenting the recomposed matrix to correspond to segments of the acquired image;

applying the segmented parts of the recomposed matrix to the corresponding defective segmented part of the acquired image to correct the identified defect.

11. The method of claim 6, wherein the acquired image is vertically and horizontally segmented for removing any additional artifacts in the acquired image using segmented parts of the acquired image.

12. The method of claim 11, wherein the additional artifacts corrected using vertical or horizontal segmentation are not FPN.

13. The method of claim 6, wherein the acquired image or video is a live image or video.

14. The method of claim 6 further comprising: displaying image or video processed using the recomposed matrix.

15. The method according to claim 1, wherein recomposing the matrix further includes: measuring pixel intensity values of one or more bands of the image or video to identify a range of intensity values; and wherein the offsetting parameters of the recomposed matrix are applied to the imaging data such that the filtered imaging data does not fall with the range of intensity values.

16. A non-transitory computer readable medium storing instructions that, when executed by one or more processors of a console, cause the console to perform a method according to claim 1.

17. An imaging console comprising:

one or more imaging interfaces for acquiring imaging data; a processor;

a memory having stored thereon instructions executable by the processor that causes the imaging console to perform a method according to claim 1.

18. The console of claim 17, wherein the imaging data is acquired via a remote imaging source in communication with the console via a first imaging interface.

19. The console of claim 18, wherein the imaging data is acquired via an external imaging source.

20. The console of claim 19, wherein the external imaging source is a remote imaging sensor.

21. A system comprising:

a sensor for acquiring images or video each having imaging data;

a console according to claim 17, and wherein the sensor is in communication with the console via a sensor device interface.

\* \* \* \* \*